(12) United States Patent
Qi et al.

(10) Patent No.: US 11,190,665 B2
(45) Date of Patent: Nov. 30, 2021

(54) IMAGE SCANNING APPARATUS, AND METHOD AND APPARATUS FOR CONTROLLING RECEIVING OF IMAGE SCANNING OPTICAL SIGNAL

(71) Applicant: WEIHAI HUALING OPTO-ELECTRONICS CO., LTD, Shandong (CN)

(72) Inventors: Wuchang Qi, Shandong (CN); Juan Deng, Shandong (CN); Junwei Ma, Shandong (CN); Kai Wang, Shandong (CN)

(73) Assignee: WEIHAI HUALING OPTO-ELECTRONICS CO., LTD, Shandong (CN)

( * ) Notice: Subject to any disclaimer, the term of this patent is extended or adjusted under 35 U.S.C. 154(b) by 0 days.

(21) Appl. No.: 16/621,253

(22) PCT Filed: Sep. 4, 2018

(86) PCT No.: PCT/CN2018/103924
§ 371 (c)(1),
(2) Date: Dec. 11, 2019

(87) PCT Pub. No.: WO2019/148835
PCT Pub. Date: Aug. 8, 2019

(65) Prior Publication Data
US 2021/0281703 A1    Sep. 9, 2021

(30) Foreign Application Priority Data

Jan. 31, 2018 (CN) .......................... 201810096676.3

(51) Int. Cl.
*H04N 1/00* (2006.01)
*H04N 1/031* (2006.01)
(Continued)

(52) U.S. Cl.
CPC ..... *H04N 1/00933* (2013.01); *H04N 1/02845* (2013.01); *H04N 1/0311* (2013.01); *H04N 1/193* (2013.01)

(58) Field of Classification Search
CPC ............ H04N 1/00933; H04N 1/0311; H04N 1/193; H04N 1/02845; H04N 5/2256;
(Continued)

(56) References Cited

U.S. PATENT DOCUMENTS

| 7,335,963 | B2 | 2/2008 | Ford | |
| 9,348,290 | B2* | 5/2016 | Oomoto | ............ G03G 15/6529 |

(Continued)

FOREIGN PATENT DOCUMENTS

| CN | 201497576 U | 6/2010 |
| CN | 102694952 A | 9/2012 |

(Continued)

*Primary Examiner* — Negussie Worku
(74) *Attorney, Agent, or Firm* — Gang Yu

(57) ABSTRACT

An image scanning apparatus, and a method and an apparatus for controlling receiving of an image scanning optical signal are provided. The mage scanning apparatus may include an array photosensitive pixel unit configured to receive at least one optical signal, and a control circuit connected with the array photosensitive pixel unit and configured to control the array photosensitive pixel unit to receive the at least one optical signal. With the adoption of the image scanning apparatus, and the method and the apparatus for controlling receiving of the image scanning optical signal, the problem in the related art that an image is easily interfered by external stray lights within a non-exposure time of a scanning period and accordingly quality of a scanned image is reduced may be solved.

10 Claims, 6 Drawing Sheets

(51) Int. Cl.
*H04N 1/028* (2006.01)
*H04N 1/193* (2006.01)

(58) Field of Classification Search
CPC ......... H04N 2005/2255; H04N 5/2354; H04N 21/4223; H04N 13/254; H04N 5/232; H04N 5/23245; H04N 5/3696; H04N 5/37455; H04N 5/378; H04N 7/183; H04N 13/207; H04N 21/431; H04N 5/2254; H04N 5/23293; H04N 5/2353; H04N 5/2628; H04N 5/272; H04N 13/00; H04N 13/271; H04N 13/332; H04N 1/00307; H04N 21/2393; H04N 21/44218; H04N 21/4722; H04N 2201/0096; H04N 5/2251; H04N 5/23254; H04N 5/23296; H04N 5/2352; H04N 5/243; H04N 5/33; H04N 5/3454; H04N 5/3532; H04N 5/361; H04N 5/3745; H04N 5/37457; H04N 7/18; H04N 9/045; H04N 9/04557; H04N 9/3105; H04N 9/3114; H04N 9/3129; H04N 9/3152; H04N 9/317; H04N 9/3188; H04N 13/128; H04N 13/20; H04N 2013/0081; H04N 5/232035; H04N 5/23209; H04N 5/23212; H04N 5/23287; H04N 5/232935; H04N 5/232939; H04N 5/2351; H04N 5/2621; H04N 5/341; H04N 5/347; H04N 5/353; H04N 5/3537; H04N 5/35554; H04N 5/3575; H04N 5/367; H04N 5/3675; H04N 5/36961; H04N 5/374; H04N 5/379; H04N 7/185; H04N 9/07; H04N 9/312; H04N 9/3126; H04N 9/3141; H04N 9/3147; H04N 9/3155; H04N 9/3164; H04N 9/3179; G06F 3/042; G06F 3/0412; G06F 3/011; G06F 3/012; G06F 1/1686; G06F 3/04883; G06F 16/00; G06F 16/51; G06F 16/958; G06F 3/0304; G06F 3/0346; G06F 3/03542; G06F 3/03545; G06F 3/0416; G06F 1/1626; G06F 1/163; G06F 1/1632; G06F 1/1698; G06F 21/32; G06F 3/013; G06F 3/0414; G06F 3/04162; G06F 3/04166; G06F 3/0418; G06F 3/0425; G06F 3/04842; G06F 3/0845; G06F 3/04847; G06F 3/0488; G06F 3/1454; G06F 3/147; G06F 2203/04103; G06F 3/017; G06F 3/0421; G06F 7/58; G06F 7/588; G06K 9/00671; G06K 9/3233; G06K 9/00255; G06K 9/0004; G06K 9/00268; G06K 9/2027; G06K 9/2036; G06K 9/209; G06K 9/22; G06K 9/4652; G06K 2009/0006; G06K 2009/00932; G06K 9/00013; G06K 9/0002; G06K 9/00033; G06K 9/00046; G06K 9/00288; G06K 9/00302; G06K 9/00409; G06K 9/00892; G06K 9/4661; G06K 9/52; G06K 9/6267; G09G 2360/144; G09G 2370/16; G09G 2370/18; G09G 3/3406; G09G 2360/16; G09G 5/00; G09G 2320/0261; G09G 2354/00; G09G 2358/00; G09G 3/001; G09G 3/346; G09G 5/377; G09G 2300/0809; G09G 2310/0237; G09G 2360/146; G09G 2360/148; G09G 2370/022; G09G 2370/04; G09G 2370/042; G09G 2370/06; G09G 2370/10; G09G 2380/10; G09G 3/3225; G09G 5/14; G09G 2300/023; G09G 2300/0491; G09G 2300/08; G09G 2310/0235; G09G 2310/0275; G09G 2310/0297; G09G 2320/028; G09G 2320/0606; G09G 2320/0626; G09G 2320/0633; G09G 2320/0673; G09G 2320/068; G09G 2320/08; G09G 2340/0407; G09G 2380/08; G09G 3/02; G09G 3/025; G09G 3/2007; G09G 3/2022; G09G 3/32; G09G 3/3233; G09G 3/3275; G09G 3/34; G09G 3/3473; G09G 3/3611; G09G 5/10

USPC ........................................................ 358/400

See application file for complete search history.

(56) References Cited

U.S. PATENT DOCUMENTS

| | | | | |
|---|---|---|---|---|
| 9,804,000 | B2* | 10/2017 | Chang | G06F 3/03543 |
| 10,531,019 | B2* | 1/2020 | Tang | H04N 5/35572 |
| 2007/0075218 | A1* | 4/2007 | Gates | H04N 3/155 |
| | | | | 250/208.1 |
| 2009/0194938 | A1* | 8/2009 | Mizutani | G03G 15/657 |
| | | | | 271/264 |
| 2010/0086318 | A1* | 4/2010 | Nishino | G03G 15/2028 |
| | | | | 399/21 |
| 2011/0033214 | A1* | 2/2011 | Funabiki | G03G 15/2028 |
| | | | | 399/323 |
| 2015/0022865 | A1 | 1/2015 | Nakamura | |
| 2015/0085298 | A1* | 3/2015 | Chang | G06F 3/0317 |
| | | | | 356/497 |
| 2015/0144768 | A1* | 5/2015 | Lee | G06F 1/3259 |
| | | | | 250/208.1 |
| 2016/0094749 | A1 | 3/2016 | Sahara | |
| 2018/0150935 | A1* | 5/2018 | Tang | G06T 5/002 |
| 2018/0247390 | A1* | 8/2018 | Tang | H04N 5/347 |
| 2019/0005624 | A1* | 1/2019 | Mao | G06T 5/002 |
| 2020/0286942 | A1* | 9/2020 | Jin | H01L 31/02327 |

FOREIGN PATENT DOCUMENTS

| | | |
|---|---|---|
| CN | 103458158 A | 12/2013 |
| CN | 104822028 A | 8/2015 |
| CN | 105679782 A | 6/2016 |
| CN | 108270942 A | 7/2018 |
| CN | 207820026 U | 9/2018 |

* cited by examiner

A control signal is sent to an array photosensitive pixel unit, and the abovementioned control signal is used for controlling the array photosensitive pixel unit to receive at least one optical signal — S2202

IMAGE SCANNING APPARATUS, AND METHOD AND APPARATUS FOR CONTROLLING RECEIVING OF IMAGE SCANNING OPTICAL SIGNAL

TECHNICAL FIELD

The present disclosure relates to the field of communications, and in particular to an image scanning apparatus, and a method and an apparatus for controlling receiving of an image scanning optical signal.

BACKGROUND

A contact image sensor has been applying to financial devices more and more widely, and the financial devices have more severe quality requirements on scanned images along an increasingly complicated financial environment. As a core imaging part of the financial devices, performance of the contact image sensor may directly influence performance of the financial devices.

The contact image sensor is a linear array scanning device by which photosensitive pixel units are closely arranged into a linear array, and an exposure time period (namely a charge accumulation time period) of each pixel of each reading period is consistent. Upon ending of the charge accumulation time period, a shift register may control an analog switch to open at a time, so as to sequentially output at least one electric signal of the pixel in form of analog signal. In this way, at least one analog image signal of an original may be acquired and image scanning of a row may be completed. And then, relative positions of the original and the contact image sensor are adjusted to implement image scanning of a next row until a whole picture of the original is scanned and an image is formed.

During the abovementioned working process of the contact image sensor, the exposure time period is part of each row scanning period. During the exposure time period, lights from a light source may irradiate onto the original, lights reflected by the original may be received by a photosensitive chip, and charge is accumulated, thereby forming an analog output. However, at other time periods outside lighting within the row scanning period, the photosensitive chip may accumulate some additional interference power due to influence of interference of external stray lights. In this way, there is a difference between the analog signal output outward by the photosensitive chip and real image information of the original, and accordingly quality of the scanned image is influenced.

To sum up, there is a problem in related art that the image is easily interfered by the external stray lights within a non-exposure time period of the scanning period, and accordingly quality of the scanned image is reduced.

As to the abovementioned technical problem, no effective solution has been provided yet in the related art.

SUMMARY

At least some embodiments of the present disclosure provide an image scanning apparatus, and a method and an apparatus for controlling receiving of an image scanning optical signal, so as at least to partially solve the problem in the related art that an image is easily interfered by external stray lights within a non-exposure time period of a scanning period, and accordingly quality of a scanned image is reduced.

In an embodiment of the present disclosure, an image scanning apparatus is provided, including: an array photosensitive pixel unit configured to receive at least one optical signal, and a control circuit connected with the array photosensitive pixel unit and configured to control the array photosensitive pixel unit to receive the at least one optical signal.

Optionally, the control circuit is configured to implement at least one of the following operations: when a light source of the apparatus gives out lights, the control circuit is configured to send a first control pulse signal to control at least one photosensitive pixel point of the array photosensitive pixel unit to receive the at least one optical signal of an image reflected under the light source; and when the light source of the apparatus does not give out the lights, the control circuit is configured to send a second control pulse signal to control the at least one photosensitive pixel point of the array photosensitive pixel unit to stop receiving the at least one optical signal.

Optionally, the control circuit may include: a control switch configured to receive the first control pulse signal from the light source and control the array photosensitive pixel unit according to the first control pulse signal to receive the at least one optical signal of the image reflected under the light source, or control the array photosensitive pixel unit according to the second control pulse signal to stop receiving the at least one optical signal.

Optionally, the array photosensitive pixel unit may further be configured to convert the at least one optical signal to at least one electric signal, and store the at least one electric signal in form of charge.

Optionally, the image scanning apparatus may further include: a reset circuit connected with the array photosensitive pixel unit and configured to reset the charge stored by the array photosensitive pixel unit within each image scanning period.

Optionally, the image scanning apparatus may further include: a switch circuit connected with the array photosensitive pixel unit and configured to store the at least one electric signal in a capacitor connected with the switch circuit; a scanning circuit connected with the capacitor and configured to receive the at least one electric signal transmitted by the capacitor and control an output of the at least one electric signal; and an electric signal processing circuit connected with the scanning circuit and configured to receive the at least one electric signal transmitted by the scanning circuit and process the at least one electric signal.

Optionally, the electric signal processing circuit may include: an amplifier configured to amplify the at least one processed electric signal to output at least one analog voltage signal of the image.

In another embodiment of the present disclosure, a method for controlling receiving of an image scanning optical signal is provided, including: a control signal is sent to an array photosensitive pixel unit, and the control signal is used for controlling the array photosensitive pixel unit to receive at least one optical signal.

Optionally, the step that the control signal is sent to the array photosensitive pixel unit may include: when a light source gives out lights, a first control pulse signal from the light source is received; and the first control pulse signal is sent to the array photosensitive pixel unit, so as to control at least one photosensitive pixel point of the array photosensitive pixel unit to receive the at least one optical signal of an image reflected under the light source.

Optionally, the step that the control signal is sent to the array photosensitive pixel unit may include: when the light source does not give out the lights, a second control pulse signal from the light source is received; and the second control pulse signal is sent to the array photosensitive pixel unit, so as to control the at least one photosensitive pixel point of the array photosensitive pixel unit to stop receiving the at least one optical signal.

In another embodiment of the present disclosure, an apparatus for controlling receiving of an image scanning optical signal is provided, including: a sending component configured to send a control signal to an array photosensitive pixel unit, and the control signal is used for controlling the array photosensitive pixel unit to receive at least one optical signal.

Optionally, the sending component may include: a first receiving element configured to, when a light source gives out lights, receive a first control pulse signal from the light source; and a first sending element configured to send the first control pulse signal to the array photosensitive pixel unit, so as to control at least one photosensitive pixel point of the array photosensitive pixel unit to receive the at least one optical signal of an image reflected under the light source.

Optionally, the sending component may include: a second receiving element configured to, when the light source does not give out the lights, receive a second control pulse signal from the light source; and a second sending element configured to send the second control pulse signal to the array photosensitive pixel unit, so as to control the at least one photosensitive pixel point of the array photosensitive pixel unit to stop receiving the at least one optical signal.

In another embodiment of the present disclosure, a storage medium is further provided, the storage medium stores a computer program, and the computer program is configured to implement steps in any one of the abovementioned method embodiments when the computer program runs.

In another embodiment of the present disclosure, an electronic apparatus is further provided, including a memory and a processor, the memory stores a computer program, and the processor is configured to run the computer program to implement steps in any one of the abovementioned method embodiments.

Through the at least some embodiments of the present disclosure, the array photosensitive pixel unit in the image scanning apparatus is configured to receive the at least one optical signal, the control circuit is connected with the array photosensitive pixel unit and configured to control the array photosensitive pixel unit to receive the at least one optical signal. In this way, the control circuit may control the array photosensitive pixel unit to receive or not to receive the at least one optical signal, thus the external stray lights may not be received. Therefore, the problem in the related art that the image is easily interfered by the external stray lights within the non-exposure time of the scanning period and accordingly the quality of the scanned image is reduced may be solved, and an effect of improving image scanning quality may be achieved.

BRIEF DESCRIPTION OF THE DRAWINGS

The accompanying drawings described herein are used to provide a further understanding of the present disclosure, and constitute a part of the present disclosure, and the exemplary embodiments of the present disclosure and the description thereof are used to explain the present disclosure, but do not constitute improper limitations to the present disclosure. In the drawings.

DETAILED DESCRIPTION

The present disclosure will be described below in detail with reference to the drawings and in combination with the embodiments. It is to be noted that the embodiments in the present disclosure and features in the embodiments may be combined with each other without conflict.

It is to be noted that terms "first", "second" and the like in the description, claims and the abovementioned drawings of the present disclosure are adopted not to describe a specific sequence but to distinguish similar objects.

Embodiment One

Figures 1, 2:
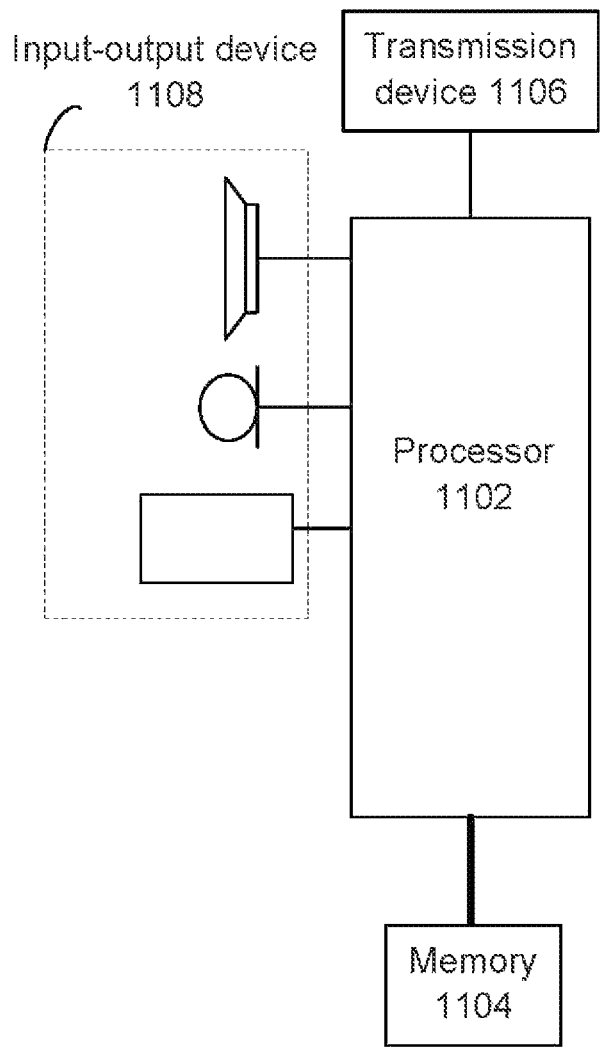
FIG. 1 is a hardware structural diagram of a mobile terminal of a method for controlling receiving of an image scanning optical signal according to an embodiment of the present disclosure.
FIG. 2 is a flow diagram of a method for controlling receiving of an image scanning optical signal according to an embodiment of the present disclosure.

A method embodiment provided by this embodiment of the present disclosure may be implemented on a mobile terminal, a computer terminal or a similar computing apparatus. Taking the method embodiment running on the mobile terminal as an example, FIG. 1 is a hardware structural diagram of a mobile terminal of a method for controlling receiving of an image scanning optical signal according to an embodiment of the present disclosure. As shown in FIG. 1, the mobile terminal 110 may include one or more (one is shown in FIG. 1) processors 1102 (the processor 1102 may include, but is not limited to, a Micro-programmed Control Unit (MCU) or a Field Programmable Gate Array (FPGA) and other processing apparatuses) and a memory 1104 configured to store data. Optionally, the abovementioned mobile terminal may further include a transmission device 1106 configured to have communication function and an input-output device 1108. Those skilled in the art may understand that a structure shown in FIG. 1 is illustrative only and is not intended to constitute limitations to the structure of the abovementioned mobile terminal. For example, the mobile terminal 110 may further include components which are more or less than those in FIG. 1, or have a configuration different from that shown in FIG. 1.

The memory 1104 may be configured to store a computer program, for example, a software program and a component of present disclosure software, such as the computer program corresponding to the method for controlling receiving of the image scanning optical signal in the embodiment of the present disclosure, and the processor 1102 runs the computer program stored in the memory 1104, so as to implement various functional present disclosures and data processing, thus achieve the abovementioned method. The memory 1104 may include a high-speed Random Access Memory (RAM), and may further include a non-volatile memory, such as one or more magnetic storage apparatuses, a flash memory or other non-volatile solid memories. In some embodiments, the memory 1104 may further include a memory remotely configured relative to the processor 1102, and these remote memories may be connected to the mobile terminal 110 through a network. An example of the abovementioned network may include, but is not limited to, Internet, an Intranet, a local area network (LAN), a mobile communication network and a combination thereof.

The transmission apparatus 1106 is configured to receive or send data through one network. A specific embodiment of the abovementioned network may include a wireless network provided by a communication provider of the mobile terminal 110. In an example, the transmission apparatus 1106 may include a Network Interface Controller (NIC) which may be connected to other network devices through a base station to accordingly achieve communication with the Internet. In an example, the transmission apparatus 1106 may be a Radio Frequency (RF) component which is configured to implement communication with the Internet through a wireless mode.

The embodiment provides an image scanning apparatus, specifically including: an array photosensitive pixel unit configured to receive at least one optical signal, a control circuit connected with the abovementioned array photosensitive pixel unit and configured to control the array photosensitive pixel unit to receive the at least one optical signal. In the embodiment, the control circuit may control the array photosensitive pixel unit to receive or not to receive the at least one optical signal, thus not to receive external stray lights. Therefore, the problem in the related art that an image is easily interfered by the external stray lights within a non-exposure time of a scanning period and accordingly quality of a scanned image is reduced may be solved, and an effect of improving image scanning quality may be achieved.

In an optional embodiment, the abovementioned control circuit is configured to implement at least one of the following operations: when a light source of the abovementioned apparatus gives out lights, the abovementioned control circuit is configured to send a first control pulse signal to control at least one photosensitive pixel point of the abovementioned array photosensitive pixel unit to receive the at least one optical signal of the abovementioned image reflected in the abovementioned light source; and when the light source of the abovementioned apparatus does not give out the lights, the abovementioned control circuit is configured to send a second control pulse signal to control the at least one photosensitive pixel point of the abovementioned array photosensitive pixel unit to stop receiving the at least one optical signal. In the embodiment, the control signal of the control circuit may control the array photosensitive pixel unit to receive the at least one optical signal of the light source and not to receive any optical signal of the external stray lights, thus image scanning quality may be improved.

In an optional embodiment, the abovementioned control circuit may include a control switch configured to receive the first control pulse signal from the abovementioned light source and control the abovementioned array photosensitive pixel unit according to the abovementioned first control pulse signal to receive the at least one optical signal of the abovementioned image reflected under the abovementioned light source, or control the abovementioned array photosensitive pixel unit according to the second control pulse signal to stop receiving the at least one optical signal. In the embodiment, the control switch is connected with the light source and may generate different control pulse signals in real time according to the pulse signal of the light source, so as to control the array photosensitive pixel unit to open or close.

In an optional embodiment, the abovementioned array photosensitive pixel unit may further be configured to convert the at least one optical signal to at least one electric signal, and store the at least one electric signal in form of charge.

In an optional embodiment, the abovementioned image scanning apparatus may further include: a reset circuit connected with the abovementioned array photosensitive pixel unit and configured to reset the charge of the abovementioned array photosensitive pixel unit stored within each image scanning period. In the embodiment, the reset circuit may achieve reset of the photosensitive pixel unit, thus reset the charge accumulated by the photosensitive pixel unit within a last row scanning period upon starting of the each row scanning period, so as to prevent occurrence of interference between rows.

In an optional embodiment, the abovementioned image scanning apparatus may further include: a switch circuit connected with the abovementioned array photosensitive pixel unit and configured to store the at least one electric signal in a capacitor connected with the abovementioned switch circuit; a scanning circuit connected with the abovementioned capacitor and configured to receive the at least one electric signal transmitted by the abovementioned capacitor and control an output of the at least one electric signal; and an electric signal processing circuit connected with the abovementioned scanning circuit and configured to receive the at least one electric signal transmitted by the abovementioned scanning circuit and process the abovementioned at least one electric signal. The abovementioned electric signal processing circuit may include an amplifier configured to amplify the at least one processed electric signal to output at least one analog voltage signal of the abovementioned image. In the embodiment, the abovementioned switch circuit is mainly configured to transmit the charge stored by the array photosensitive pixel unit and form at least one Bit-s output signal. The at least one Bit-s signal is processed by the at least one electric signal processing circuit, and finally at least one Variable Speed Integrated Generator Confidential (VSIG) signal after amplification is output. The at least one VSIG signal is the at least one analog voltage signal of the at least one electric signal converted from lighting information received by each photosensitive pixel unit.

Embodiment Two

The embodiment provides a method for controlling receiving of an image scanning optical signal. FIG. 2 is a flow diagram of a method for controlling receiving of an image scanning optical signal according to an embodiment of the present disclosure. As shown in FIG. 2, a flow may include the following steps.

At step S2202, a control signal is sent to an array photosensitive pixel unit, and the abovementioned control signal is used for controlling the array photosensitive pixel unit to receive at least one optical signal.

Through the abovementioned step, a control circuit sends the control signal to the array photosensitive pixel unit to control the array photosensitive pixel unit to receive at least one optical signal. In this way, the control circuit may control the array photosensitive pixel unit to receive or not to receive the at least one optical signal, thus not receive external stray lights. Therefore, the problem in the related art that an image is easily interfered by the external stray lights within a non-exposure time of a scanning period and accordingly quality of a scanned image is reduced may be solved, and an effect of improving image scanning quality may be achieved.

Optionally, an implementation part of the abovementioned step may be the control circuit, but is not limited to the control circuit.

In an optional embodiment, the step that the control signal is sent to the abovementioned array photosensitive pixel unit may include: when a light source gives out lights, a first control pulse signal is received from the abovementioned light source, and the abovementioned first control pulse signal is sent to the at least one array photosensitive pixel unit, so as to control a photosensitive pixel point of the abovementioned array photosensitive pixel unit to receive the at least one optical signal of the abovementioned image reflected in the abovementioned light source.

In an optional embodiment, the step that the control signal is sent to the abovementioned array photosensitive pixel unit may include: when the light source of the abovementioned apparatus does not give out the lights, a second control pulse signal is received from the abovementioned light source, and the abovementioned second control pulse signal is sent to the abovementioned array photosensitive pixel unit, so as to control the at least one photosensitive pixel point of the abovementioned array photosensitive pixel unit to stop receiving the at least one optical signal.

In the abovementioned embodiment, the first control pulse signal is generated according to a high level signal, and the second control pulse signal is generated according to a low level signal.

The present disclosure will be explained below in detail in combination with specific embodiments.

The embodiment is mainly to provide a photoelectric conversion chip capable of accurately controlling a time period of receiving exposure within a row scanning period, and a contact image sensor consisting of the photoelectric conversion chip. In this way, the problem that image quality becomes worse due to interference of stray lights outside an exposure time period within a row scanning period may be solved.

The photoelectric conversion chip in the embodiment may consist of an array photosensitive pixel unit and a control circuit. The array photosensitive pixel unit is configured to receive external lights and convert optical information to at least one electric signal. The control circuit is configured to control a sequence, a working mode, storage and output of at least one analog signal and the like of the photoelectric conversion chip.

The control circuit may accurately control a time period that the array photosensitive pixel unit in the embodiment receives exposure. In this way, correctness of optical information received by the photosensitive pixel unit may be effectively controlled, interference of the external stray lights may be avoided maximally, and accordingly image scanning quality may be improved.

Within each row scanning period, when a light source of an image access device is turned on, the array photosensitive pixel unit may be in a photosensitive open state under control of a control signal, and all pixel points (corresponding to the abovementioned photosensitive pixel points) may receive the optical information reflected from an original (corresponding to the abovementioned image). When the light source of the image access device is turned off, the array photosensitive pixel unit may be in a photosensitive close state under the control of the control signal, all pixel points may no longer receive any lighting information. Through accurate control of function ON-OFF that the photosensitive pixel unit receives the at least one optical signal, the interference of an invalid signal generated by lighting of other light sources outside the light source of the image access device may be avoided effectively, a signal-to-noise ratio generated when the image access device outputs the at least one electric signal may be improved, and accordingly the image scanning quality may be improved.

The embodiment further provides a contact image sensor (equivalent to the abovementioned image scanning apparatus) consisting of the abovementioned photoelectric conversion chip. The contact image sensor may include a frame playing a role of supporting. The frame is provided with an optical lens. A side of the optical lens is provided with a light source, a circuit board is configured under the optical lens, the circuit board is provided with a sensor chip, so that a time period that the sensor chip receives exposure within a row scanning period may be accurately controlled.

During the contact image sensor scans an image, when the light source of the contact image sensor is turned on, an array photosensitive pixel unit on the sensor chip may be in a photosensitive open state under control of a control signal and all pixel points may receive optical information reflected from an original. When the light source of the contact image sensor is turned off, the array photosensitive pixel unit on the sensor chip may be in a photosensitive close state under the control of the control signal and all pixel points may no longer receive any lighting information. Through accurate control of function ON-OFF that the array photosensitive pixel unit receives the at least one optical signal, the interference of an invalid signal generated by lighting of other lights outside the light source of the contact image sensor may be avoided effectively, a signal-to-noise ratio generated when the contact image sensor outputs an electric signal may be improved, and accordingly image scanning quality may be improved.

Figure 3:
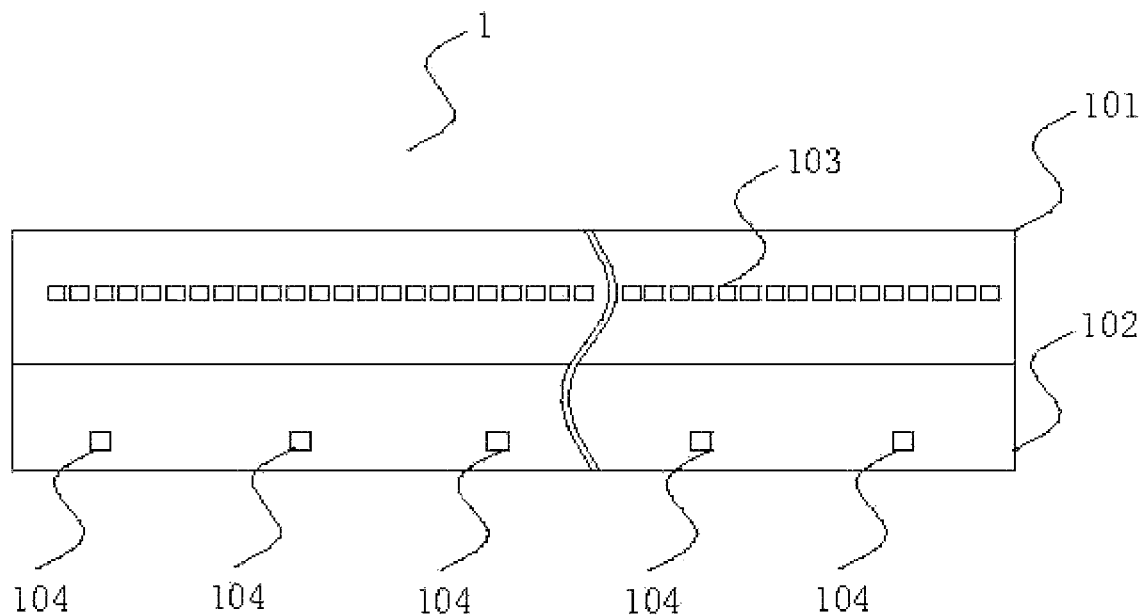
FIG. 3 is a schematic diagram of a photoelectric conversion chip according to an embodiment of the present disclosure.
Figure 4:
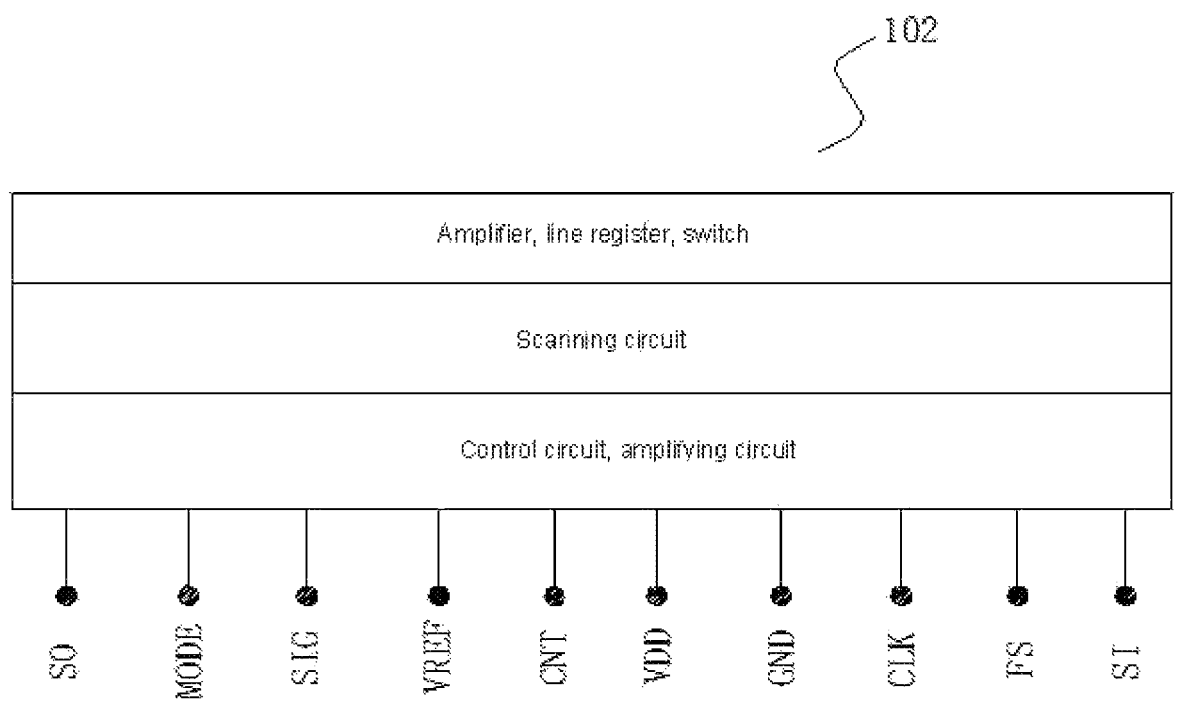
FIG. 4 is a schematic diagram of a control circuit according to an embodiment of the present disclosure.

As shown in FIG. 3, a photoelectric conversion chip 1 is provided. The photoelectric conversion chip 1 consists of an array photosensitive pixel unit 101 and a control circuit 102. Photosensitive pixel units 103 (corresponding to the abovementioned photosensitive pixel points) are linearly configured on the array photosensitive pixel, unit 101 and are configured to receive lights of an external light source. The photosensitive pixel unit is prepared from a photosensitive material and may accumulate the lights received within a certain time period and convert the lights to charge for storage. In this way, conversion from an optical signal to an electric signal may be achieved. The control circuit 102 is configured to control a sequence, a working mode, storage and output of at least one analog signal and the like of the photoelectric conversion chip, and is provided with multiple signal input-output ports 104 which are configured for input and output of the at least one electric signal. FIG. 4 shows a detailed drawing of the control circuit 102 consisting of multiple parts including an amplifier, a line register, a switching part, a scanning circuit, the control circuit, an amplifying circuit and the signal input-output ports.

Figure 5:
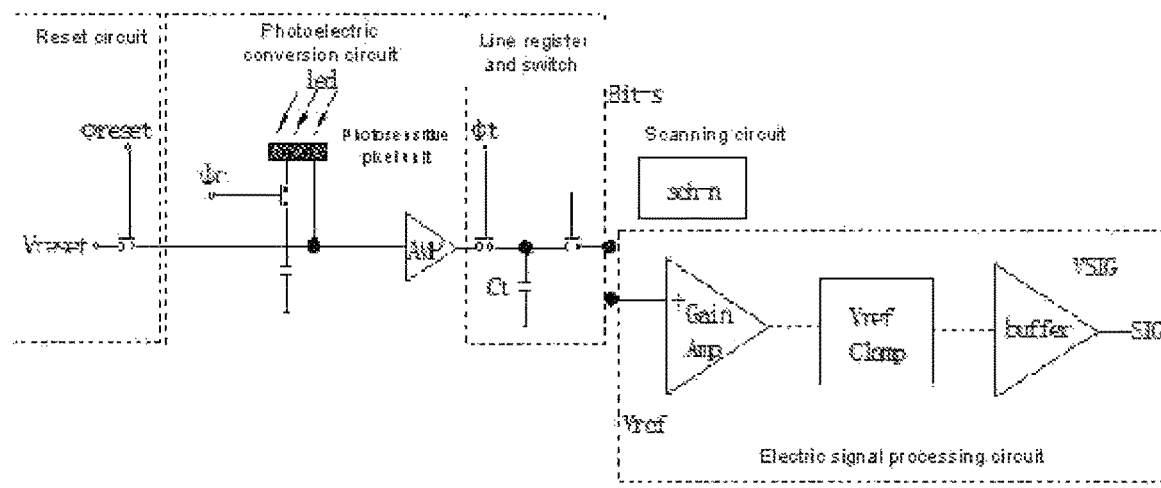
FIG. 5 is a block diagram of an internal control principle of a photoelectric conversion chip according to an embodiment of the present disclosure.
Figure 7:
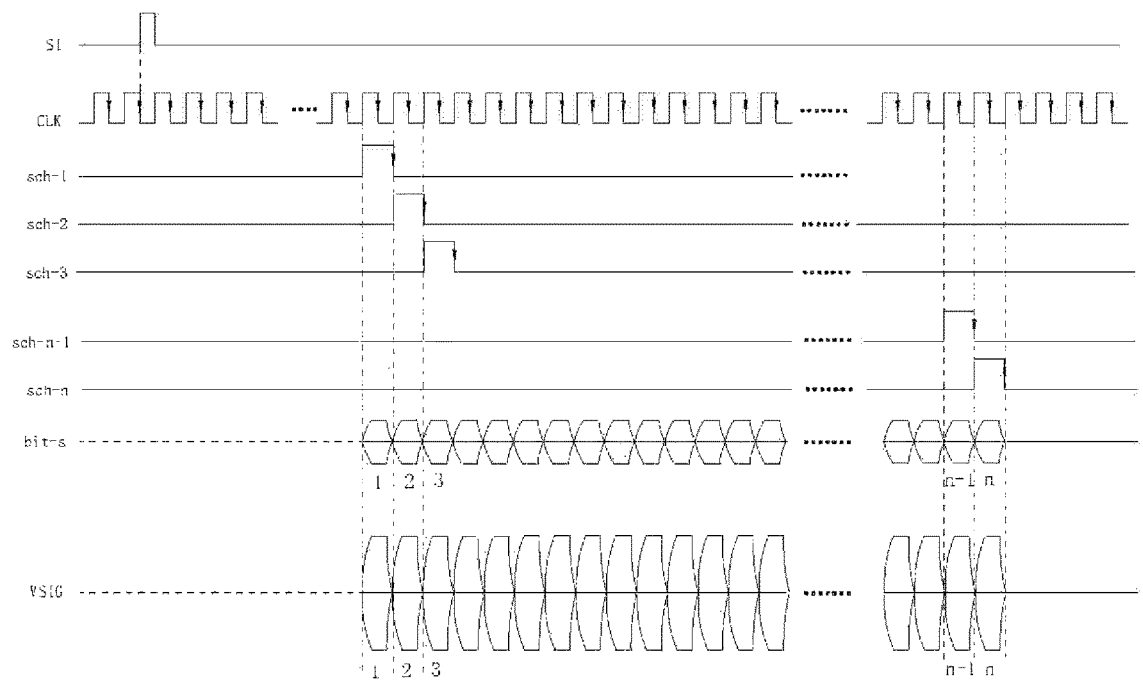
FIG. 7 is a schematic diagram of an internal logic control sequence according to a second exemplary embodiment of the present disclosure.

A block diagram of an internal control principle of the photoelectric conversion chip of the embodiment is shown in FIG. 5. The photoelectric conversion chip of the embodiment may mainly consist of a reset circuit, a photoelectric conversion circuit, the line register, the switching circuit, the scanning circuit and an electric signal processing circuit. And the reset circuit may achieve resetting of the photosensitive pixel unit and reset charge accumulated by the photosensitive pixel unit in a last row scanning period upon starting of each row scanning period, so as to prevent occurrence of interference between rows. After receiving the lights, the photosensitive pixel unit in the photoelectric conversion circuit may convert the at least one optical signal to the at least one electric signal, store the at least one electric signal in form of charge and transmit the at least one electric signal. An electric output signal of the photoelectric conversion circuit may be stored in a capacitor Ct through control of a switch Øt and output one by one under control of an output signal sch-n of the scanning circuit. As shown in FIG. 7, a Bit-s output signal is formed and may be processed by the electric signal processing circuit, and at least one Variable Speed Integrated Generator Confidential (VSIG) signal after amplification may be output finally. The at least one VSIG signal is at least one, analog voltage signal of the at least one electric signal converted from lighting information received by the each photosensitive pixel unit.

Figure 6:
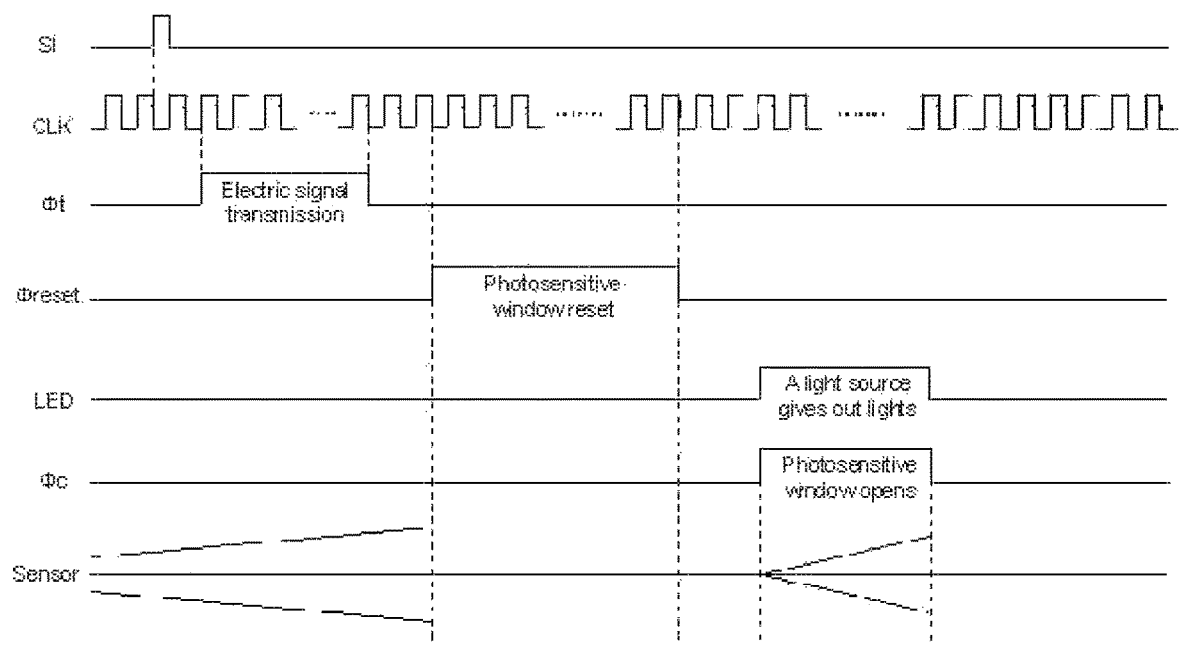
FIG. 6 is a schematic diagram of an internal logic control sequence according to a first exemplary embodiment of the present disclosure.

The sensor chip in the embodiment increases a control switch Øc (corresponding to the abovementioned control switch) of a light control circuit. The Øc is associated with a lighting pulse signal of an external LED and plays a role of a switch of controlling the photosensitive pixel unit to receive external lights with the pulse signal synchronous with a control pulse signal of the LED. As shown in FIG. 6, the photoelectric conversion chip starts to be in a working state upon startup of pulsing a positive pulse of an SI signal since starting or the row scanning period. When Øt is at a high level, the charge stored in the capacitor Ct during the fast row scanning period may start outputting to the electric signal processing circuit. Upon completion of outputting of the at least one electric signal, the output of a reset signal Ø reset may be at the high level. At the moment, the photosensitive pixel unit may be reset, and the charge accumulated on each photosensitive pixel unit may be upon completion of reset. When a lighting pulse LED signal of the external light source is at the high level and a light receiving switching signal Øc of the photosensitive pixel unit is at the high level, the photosensitive pixel unit may be in a light receiving open state, the external light source may start giving out lights under control of an LED pulse and irradiating the original, and reflected lights of the original may be received by the photosensitive pixel unit and converted to the charge for storage. When the lighting pulse LED signal of the external light source is at a low level and the light receiving switching signal Øc of the photosensitive pixel unit may be at the high level the photosensitive pixel unit may be in a light receiving close state. At the moment, the photosensitive pixel unit may no longer receive any lighting information, and a charge quantity stored will not be changed. When the photosensitive pixel unit completes conversion of the at least one optical signal to the at least one electric signal, the charge stored by the photosensitive pixel unit may be transmitted (as shown in FIG. 7) under the control of the scanning circuit and the electric signal processing circuit as shown in FIG. 5, and outputting of a final scanning electric signal may be completed Because of existence of the light receiving switching signal Øc of the photosensitive pixel unit, the optical information received by the photosensitive pixel unit may be completely from the reflected lights generated when the light source irradiates the original and may not be interfered by other external stray lights theoretically. Therefore, the output signal of the sensor chip in the embodiment may more really restore information of the original, and accordingly image scanning quality may be improved.

The control circuit accurately controls a time period that the photosensitive pixel unit receives exposure in the embodiment. In this way, correctness of the optical information received by the photosensitive pixel unit may be effectively controlled, interference of the external stray light may be avoided maximally, and accordingly the image scanning quality may be improved.

Figure 8:
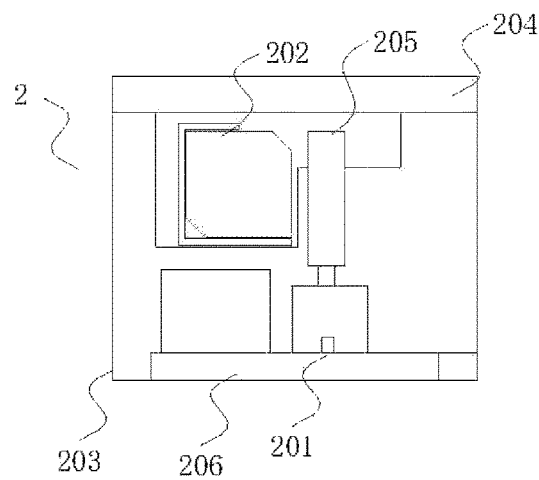
FIG. 8 is a structural schematic diagram of a contact image sensor according to an embodiment of the present disclosure.

As shown in FIG. 8, the embodiment provides a contact image sensor 2 consisting of the abovementioned photoelectric conversion chip, including a photoelectric conversion chip 201 by which a time period that a sensor chip receives exposure within a row scanning period may be accurately controlled; a light source 202 configured to provide lights and irradiate onto an original; a frame 203 configured to support a whole structure; a glass cover plate 204 configured to protect an internal structure from pollution by dust; a lens 205 configured to converge the lights onto the photoelectric conversion chip; and a circuit board 206 configured to load the photoelectric conversion chip and other circuits.

The contact image sensor is a linear array scanning device by which the photosensitive pixel units are closely arranged into a linear array, and an exposure time period (namely a charge accumulation time period) of each pixel of each reading period is consistent. Upon ending of the charge accumulation time, a shift register may control an analog switch to open at a time, so as to sequentially output an electric signal of the pixel in form of analog signal. In this way, an analog image signal of the original may be acquired and image scanning of a row may be completed. And then, relative positions of the original and the contact image sensor are adjusted, so as to implement image scanning of a next row until a whole picture of the original is scanned and an image is formed.

Figure 9:
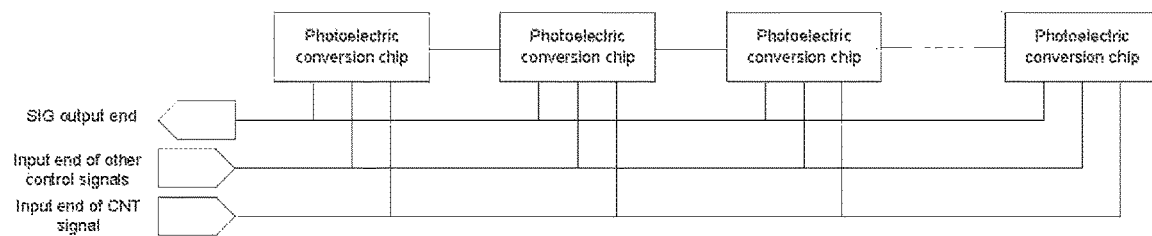
FIG. 9 is a schematic diagram of a connecting mode of a photoelectric conversion chip of a contact image sensor according to an embodiment of the present disclosure.

The photoelectric conversion chip 201 in the embodiment is connected with a mode as shown in FIG. 9. During the contact image sensor 2 scans the image, when a light source 202 of the contact image sensor is turned on, an array photosensitive pixel unit on the sensor chip may be in a photosensitive open state under control of a control signal CNT and all photosensitive pixel units may receive optical information reflected from the original and passing through the lens 205. When the light source of the contact image sensor is turned off, the array photosensitive pixel unit on the sensor chip may be in a photosensitive close state under the control of the control signal CNT and all photosensitive pixel units may no longer receive any lighting information. The photosensitive pixel unit controls to accurately receive effective lights, thereby ensuring an output of the at least one electric signal of the photoelectric conversion chip, really reflecting an output of the original information, and accordingly ensuring image quality.

Figure 10:
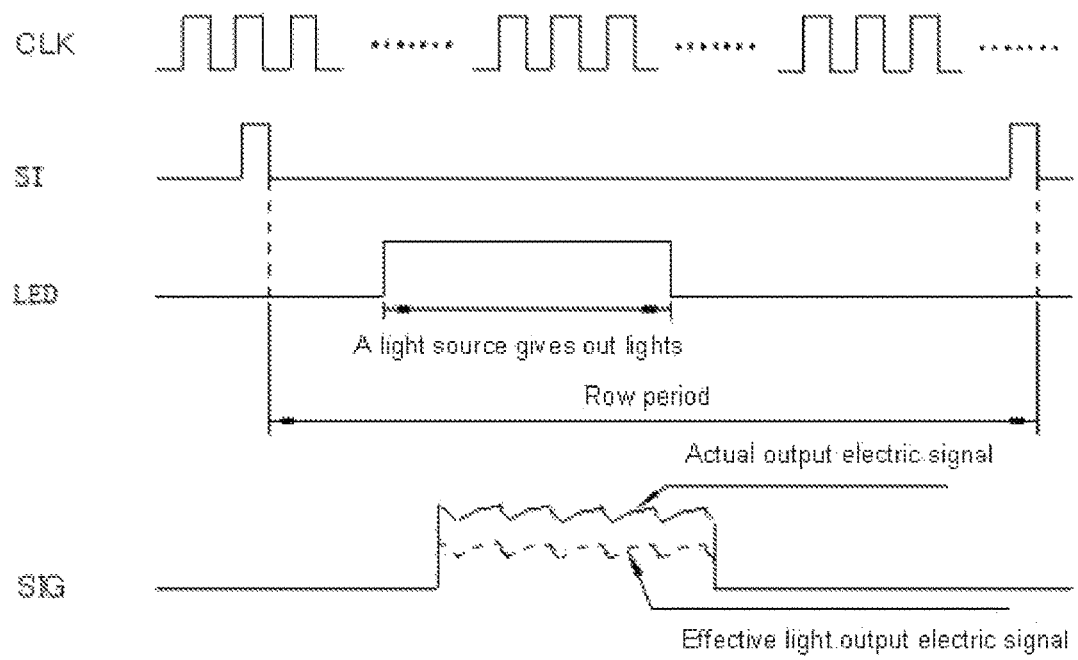
FIG. 10 is a sequence diagram of a contact image sensor in the related art.

A sequence diagram of a contact image sensor in the related art during working is shown in FIG. 10. Clock (CLK) is a clock signal that a system works, SI is a control signal of a row scanning period, LED is a light source control signal, and SIG is an electric output signal. Within each row period, when a light source of a device is turned on, namely, an LED signal is at a high level, lights received by a photosensitive pixel unit 103 of a photoelectric conversion chip are those irradiated onto an original from the light source and reflected. At the moment, at least one optical signal is at least one effective optical signal reflecting contents of the original, and at least one effective light output electric signal shown by a dotted portion in the SIG electric output signal may be formed after photoelectric conversion. When the LED signal is at a low level, the original will neither receive irradiation of any light source nor reflect onto the photosensitive pixel unit 103 theoretically. At the moment, no new optical energy will be accumulated to be converted to the SIG electric output signal. However, in a practical present disclosure, since the device is not perfectly sealed and kept away from the lights, the photoelectric conversion chip may still receive external interference stray lights in absence of irradiation of the light source, thereby leading to a situation that the actual SIG output electric signal not only includes the at least one electric signal generated by the effective lights but the at least one electric signal generated by external interference stray lights, namely, SIG full line portion in FIG. 10. It can thus be seen that a signal-to-noise ratio of the SIG output signal is reduced due to influence of the external interference stray lights, and image scanning quality will be inevitably influenced.

Figure 11:
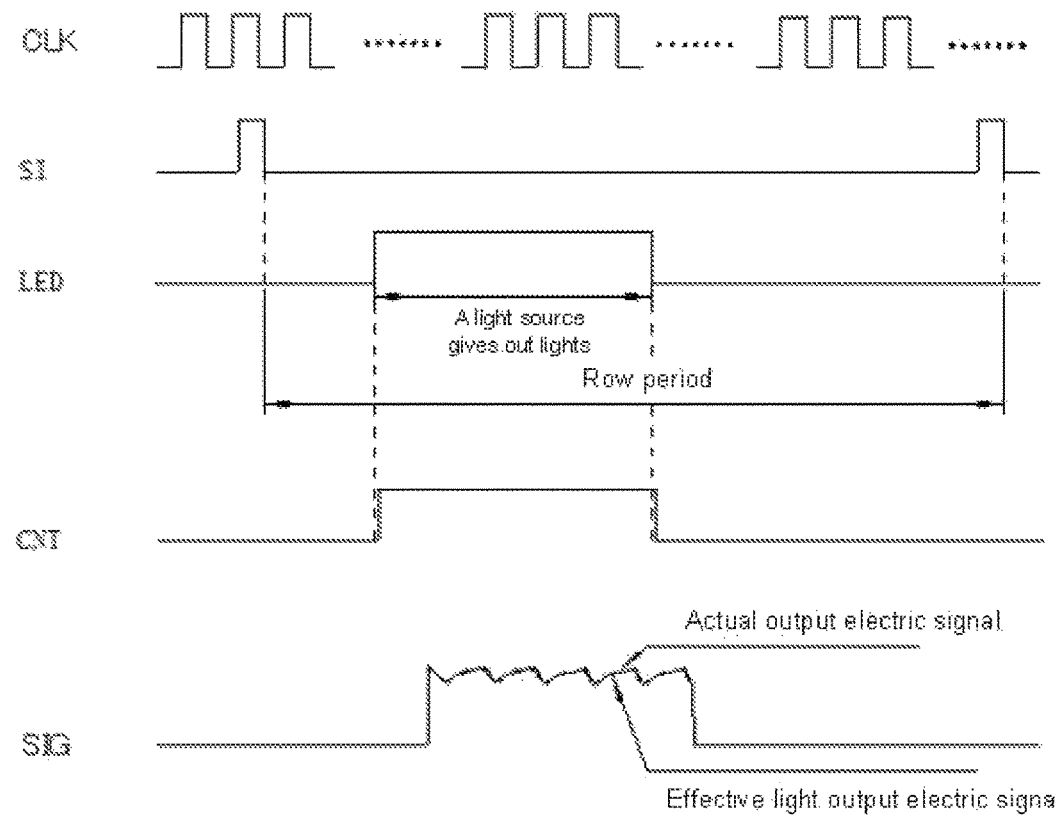
FIG. 11 is a sequence diagram of a contact image sensor according to an embodiment of the present disclosure.

A sequence diagram of a contact image sensor in the embodiment during working is shown in FIG. 11. Clock (CLK) is a clock signal that a system works, SI is a control signal of a row scanning period, LED is a light source control signal, CNT is a photosensitive pixel unit control signal, and SIG is an electric output signal. Within each row period, when a light source of a device is turned on, namely, an LED signal is at a high level, the control signal CNT may be changed to be at the high level subsequently, and a photosensitive pixel unit 103 of a photoelectric conversion chip is started under control of the control signal CNT, to receive lights reflected by an original. At the moment, at least one optical signal is at least one effective optical signal reflecting contents of the original, and an effective light output electric signal shown by a dotted portion in the SIG electric output signal may be formed after photoelectric conversion. When the LED signal is at a low level, the control signal CNT will be changed to be at the low level subsequently. At the moment, the photosensitive pixel unit 103 of the photoelectric conversion chip will be closed under the control of the control signal CNT and will no long receive any optical signal. At the moment, no new optical energy will be accumulated to be converted to the SIG electric output signal. Therefore, the SIG electric output signal of the photoelectric conversion chip is a SIG full line portion in FIG. 11. Ideally, the abovementioned SIG dotted portion should be overlapped with the abovementioned full line portion. However there is a tiny difference between the CNT signal and the LED signal due to existence of time delay of the CNT signal and the LED signal, interference of stray lights during exposure of the light source and other factors. But the difference is quite small. Furthermore, other means, such as a better hardware circuit may be taken to reduce the delay, non-glare processing inside the device and other methods may be taken to make improvement.

Through accurate control of function ON-OFF that the array photosensitive pixel unit receives the at least one optical signal, the interference of an invalid signal generated by lighting of other lights outside the light source of the contact image sensor may be avoided effectively, a signal-to-noise ratio generated when the contact image sensor outputs the at least one electric signal may be improved, and accordingly the image scanning quality may be improved.

Through description of the abovementioned mode of implementation, those skilled in the art may clearly know that the method according to the abovementioned embodiment may be achieved by means of software and a necessary universal hardware platform, and of course, by means of hardware as well. However, the former is the better mode of implementation in many cases. Based on such an understanding, the technical solution substantially or parts making contributions to the conventional art may be embodied in form of software product, and the computer software product is stored in a storage medium (such as a Read-Only Memory (ROM)/a Random Access Memory (RAM), a magnetic disk and an optical disk), including a plurality of instructions used for enabling one terminal device (which may be a cell phone, a computer, a server, a network device or the like) to implement the method in each embodiment.

Embodiment Three

The embodiment further provides an apparatus for controlling receiving of an image scanning optical signal. The apparatus is configured to achieve the abovementioned embodiments and exemplary mode of implementation, and the contents described previously will not be expounded herein. As used below, a term "component" may achieve a combination of software and/or hardware with preset functions. Although the apparatus described in the embodiment below is better achieved with the software, achievement of the hardware or the combination of the software and the hardware may be possible and be conceived.

Figure 12:
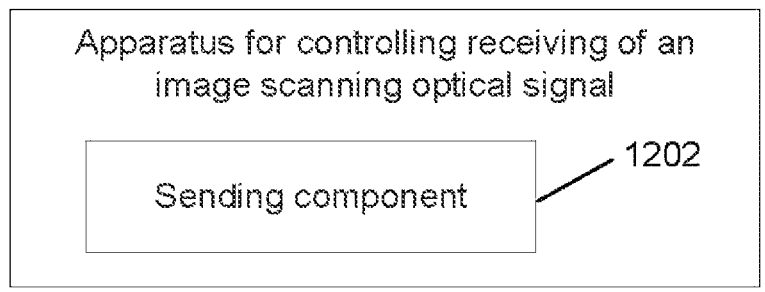
FIG. 12 is a structural block diagram of an apparatus for controlling receiving of an image scanning optical signal according to an embodiment of the present disclosure.

FIG. 12 is a structural block diagram of an apparatus for controlling receiving of an image scanning optical signal according to an embodiment of the present disclosure. As shown in FIG. 12, the apparatus may include a sending component 1202, and may be described below in detail.

The sending component 1202 is configured to send a control signal to an array photosensitive pixel unit, and the control signal is used for controlling the array photosensitive pixel unit to receive at least one optical signal.

In an optional embodiment, the sending component 1202 may include: a first receiving element configured to, when a light source gives out lights, receive a first control pulse signal from the light source; and a first sending element configured to send the first control pulse signal to the array photosensitive pixel unit, so as to control at least one photosensitive pixel point of the array photosensitive pixel unit to receive the at least one optical signal of an image reflected under the light source.

In an optional embodiment, the sending component 1202 may include: a second receiving element configured to, when the light source of the apparatus does not give out the lights, receive a second control pulse signal from the light source; and a second sending element configured to send the second control pulse signal to the array photosensitive pixel unit, so as to control the at least one photosensitive pixel point of the array photosensitive pixel unit to stop receiving the at least one optical signal.

It is to be noted that each of the abovementioned components may be achieved through software or hardware. The latter may be achieved by, but not limited to, the following ways: the abovementioned components are positioned in the same processor; or all of the abovementioned components are respectively positioned in different processors in form of any combination.

The embodiment of the present disclosure further provide a storage medium, the storage medium stores a computer program and the computer program is configured to implement steps in any one of the abovementioned method embodiments when the computer program runs.

Optionally, in the embodiment, the abovementioned storage medium may be configured to store the computer program for implementing the above steps.

Optionally, in the embodiment, the abovementioned storage medium may include, but is not be limited to, various media capable of storing the computer program, such as a U disk, a Read-Only Memory (ROM), a Random Access Memory (RAM), a mobile hard disk, a magnetic disk or an optical disk.

The embodiment of the present disclosure further provides an electronic apparatus, including a memory and a processor, the memory stores a computer program and the processor is configured to run the computer program to implement steps in any one of the abovementioned method embodiments.

Optionally, the electronic apparatus may further include a transmission device and an input-output device, and the transmission device is connected with the abovementioned processor, and the input-output device is connected with the abovementioned processor.

Optionally, the abovementioned embodiments and examples described in the optional modes of implementation may be used for reference as for the specific example in the embodiment, and will not be expounded in the embodiment.

It is apparent that those skilled in the art should know that each component or each step of the abovementioned present disclosure may be achieved by a universal computing apparatus, and the components or steps may be concentrated on a single computing apparatus or distributed on a network formed by a plurality of computing apparatuses, and may optionally be implemented by program codes executable by the computing apparatuses, so that the components or steps may be stored in the storage apparatus for implementation with the computing apparatuses, the shown or described steps may be implemented in sequences different from those described here in some circumstances, or may form each integrated circuit component respectively, or multiple components or steps therein may form a single integrated circuit component for implementation. Therefore, the present disclosure is not limited to any specific combination of hardware and software.

The above are the exemplary embodiments of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. An image scanning apparatus, comprising:
   an array photosensitive pixel unit, configured to receive at least one optical signal; and
   a control circuit, connected with the array photosensitive pixel unit, and configured to control the array photosensitive pixel unit to receive the at least one optical signal;
   wherein the control circuit is configured to implement at least one of the following operations: when a light source of the apparatus gives out lights, the control circuit is configured to send a first control pulse signal to control at least one photosensitive pixel point of the array photosensitive pixel unit to receive the at least one optical signal of an image reflected under the light source and not to receive any optical signal of external stray lights; and when the light source of the apparatus does not give out the lights, the control circuit is configured to send a second control pulse signal to control at least one photosensitive pixel point of the array photosensitive pixel unit to stop receiving the at least one optical signal.

2. The apparatus as claimed in claim 1, wherein the control circuit comprises:
   a control switch, configured to receive the first control pulse signal from the light source, and control the array photosensitive pixel unit according to the first control pulse signal to receive the at least one optical signal of the image reflected under the light source, or, control the array photosensitive pixel unit according to the second control pulse signal to stop receiving the at least one optical signal.

3. The apparatus as claimed in claim 1, wherein the array photosensitive pixel unit is further configured to convert the at least one optical signal to at least one electric signal, and store the at least one electric signal in form of charge.

4. The apparatus as claimed in claim 3, wherein the image scanning apparatus further comprises:
   a reset circuit, connected with the array photosensitive pixel unit, and configured to reset the charge stored by the array photosensitive pixel unit within each image scanning period.

5. The apparatus as claimed in claim 3, wherein the image scanning apparatus further comprises:
   a switch circuit, connected with the array photosensitive pixel unit, and configured to store the at least one electric signal in a capacitor connected with the switch circuit;
   a scanning circuit, connected with the capacitor, and configured to receive the at least one electric signal transmitted by the capacitor and control an output of the at least one electric signal; and
   an electric signal processing circuit, connected with the scanning circuit, and configured to receive the at least one electric signal transmitted by the scanning circuit, and process the at least one electric signal.

6. The apparatus as claimed in claim 5, wherein the electric signal processing circuit comprises:
   an amplifier, configured to amplify the at least one processed electric signal to output at least one analog voltage signal of the image.

7. A method for controlling receiving of an image scanning optical signal, comprising:
   sending a control signal to an array photosensitive pixel unit, wherein the control signal is used for controlling the array photosensitive pixel unit to receive at least one optical signal;
   wherein sending the control signal to the array photosensitive pixel unit comprises: when a light source gives out lights, receiving a first control pulse signal from the light source; and sending the first control pulse signal to the array photosensitive pixel unit, so as to control at least one photosensitive pixel point of the array photosensitive pixel unit to receive the at least one optical signal of an image reflected under the light source and not to receive any optical signal of external stray lights; when the light source does not give out the lights, receiving a second control pulse signal from the light source; and sending the second control pulse signal to the array photosensitive pixel unit, so as to control the at least one photosensitive pixel point of the array photosensitive pixel unit to stop receiving the at least one optical signal.

8. A non-transitory storage medium, the storage medium storing a computer program, wherein the computer program is configured to implement the method as claimed in claim 7 when the computer program runs.

9. An electronic apparatus, comprising a non-transitory memory and a processor, the memory storing a computer program, and the processor being configured to run the computer program to implement the method as claimed in claim 7.

10. An apparatus for controlling receiving of an image scanning optical signal, comprising:
   a sending component, configured to send a control signal to an array photosensitive pixel unit, wherein the control signal is used for controlling the array photosensitive pixel unit to receive at least one optical signal;
   wherein the sending component comprises: a first receiving element, configured to, when a light source gives out lights, receive a first control pulse signal from the light source; and a first sending element, configured to send the first control pulse signal to the array photosensitive pixel unit, so as to control at least one photosensitive pixel point of the array photosensitive pixel unit to receive the at least one optical signal of an image reflected under the light source and not to receive any optical signal of external stray lights; a second receiving element, configured to, when the light source does not give out the lights, receive a second control pulse signal from the light source; and a second sending element, configured to send the second control pulse signal to the array photosensitive pixel unit, so as to control the at least one photosensitive pixel point of the array photosensitive pixel unit to stop receiving the at least one optical signal.

* * * * *